C. H. CROWELL.
PAPER REWINDING AND MEASURING MACHINE.
APPLICATION FILED OCT. 9, 1913.

1,145,469.

Patented July 6, 1915.
3 SHEETS—SHEET 1.

Witnesses:
John H. Parker
Helen M. Purcell

Inventor:
Charles H. Crowell
by MacLeod, Calver, Copeland & Dike.
Attorneys.

C. H. CROWELL.
PAPER REWINDING AND MEASURING MACHINE.
APPLICATION FILED OCT. 9, 1913.

1,145,469.

Patented July 6, 1915.
3 SHEETS—SHEET 3.

Witnesses:
John H. Parker
Helen M. Purcell

Inventor.
Charles H. Crowell
by Macleod, Calver, Copeland & Dike
Attorneys.

UNITED STATES PATENT OFFICE.

CHARLES H. CROWELL, OF SWAMPSCOTT, MASSACHUSETTS.

PAPER REWINDING AND MEASURING MACHINE.

1,145,469. Specification of Letters Patent. Patented July 6, 1915.

Application filed October 9, 1913. Serial No. 794,289.

*To all whom it may concern:*

Be it known that I, CHARLES H. CROWELL, citizen of the United States, residing at Swampscott, county of Essex, State of Massachusetts, have invented a certain new and useful Improvement in Paper Rewinding and Measuring Machines, of which the following is a specification, reference being had therein to the accompanying drawings.

My invention has for its object a machine for measuring rolls of paper, gummed cloth, and the like, and is especially designed for measuring narrow rolls of material such as stay strip of tape commonly employed in the construction of paper boxes, binding tablets, books, sealing packages, and the like.

So far as known to me, the present methods of measuring tape are crude and subject to more or less inaccuracy and therefore the object of my invention is to produce a machine which shall correctly determine the amount of tape in a roll, thereby permitting the manufacturer to check up his measuring devices and the consumer the goods received.

The invention will be fully understood from the following description taken in connection with the accompanying drawings and the novel features thereof are clearly pointed out and defined in the claims at the close of the specification.

Figure 1:
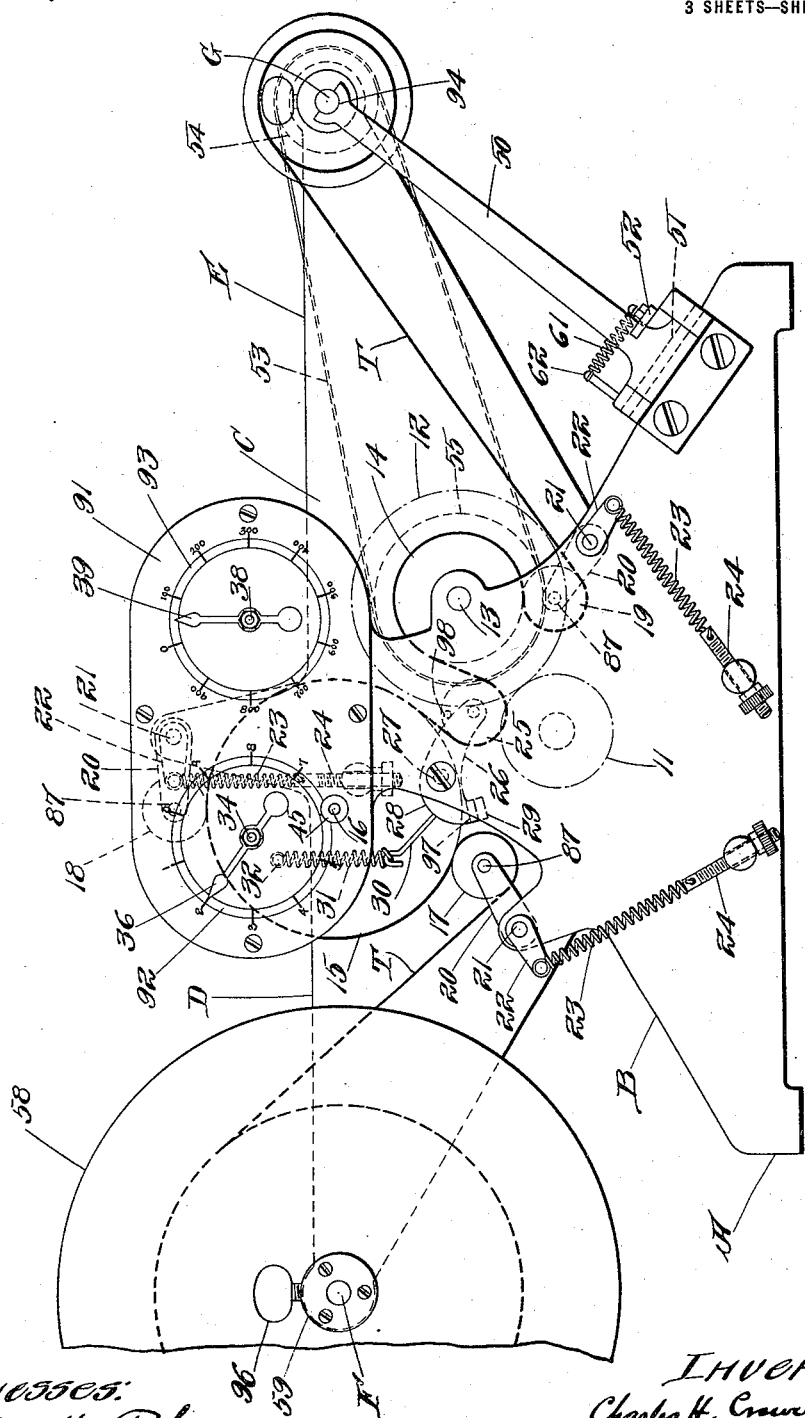
Figure 2:
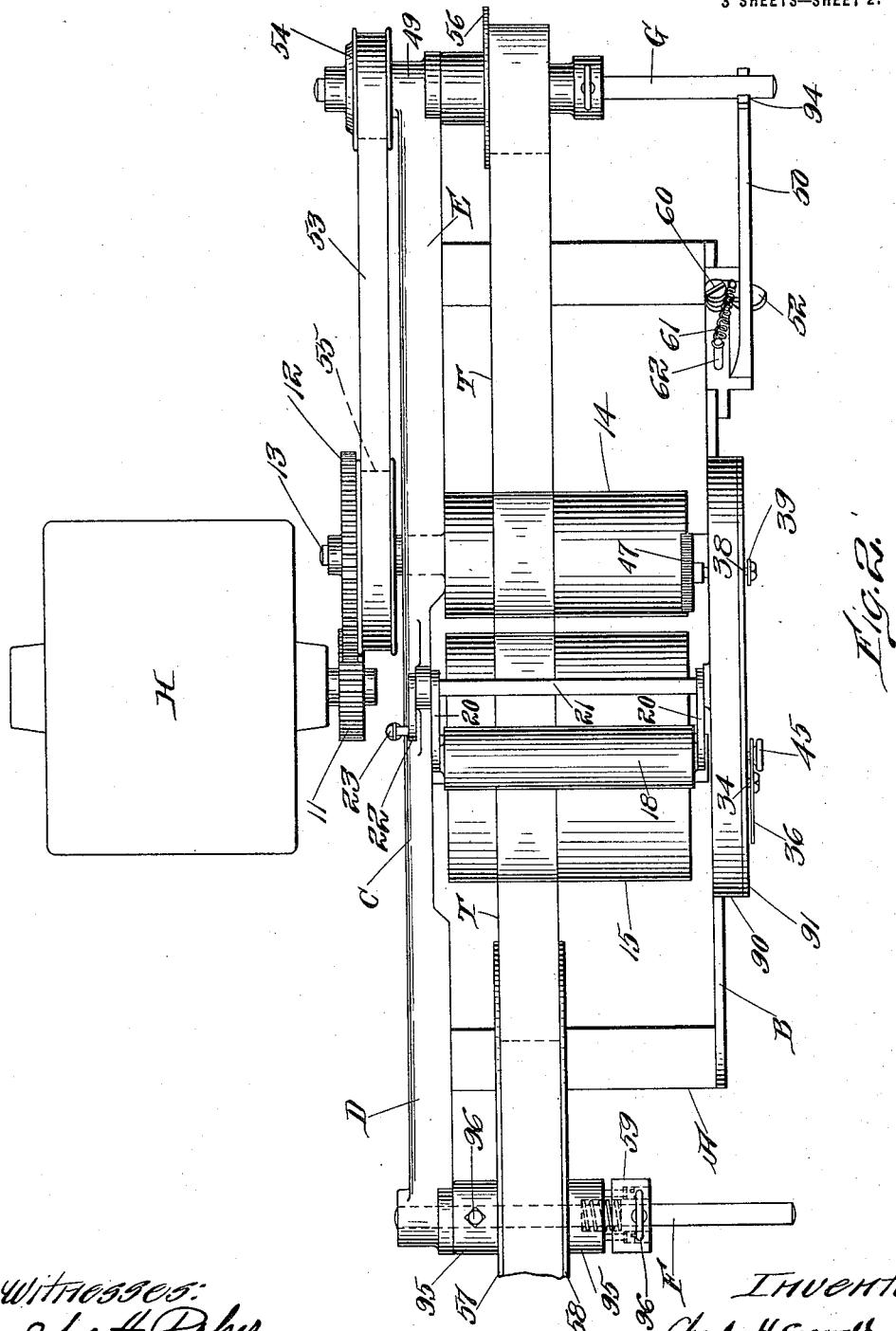
Figure 3:
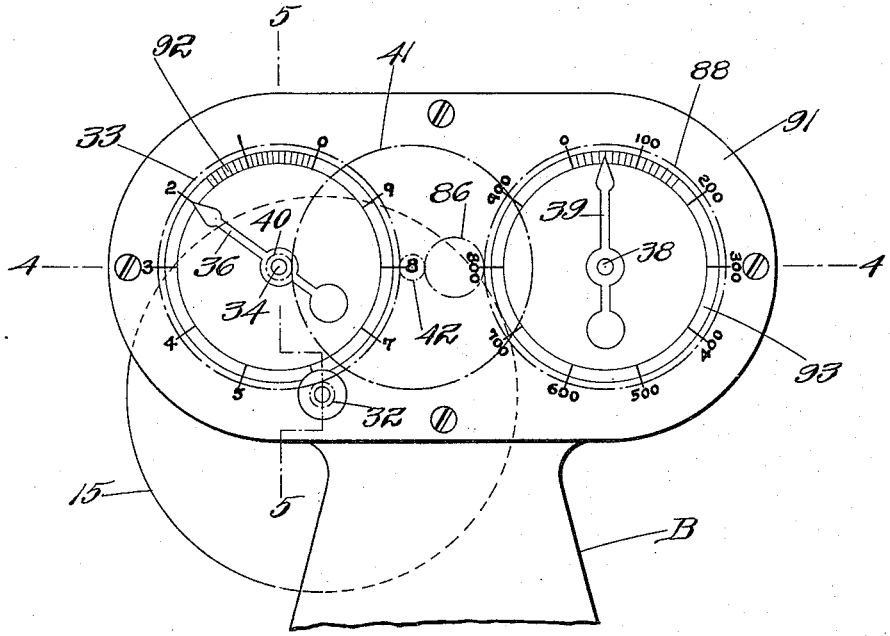
Figures 4, 5:
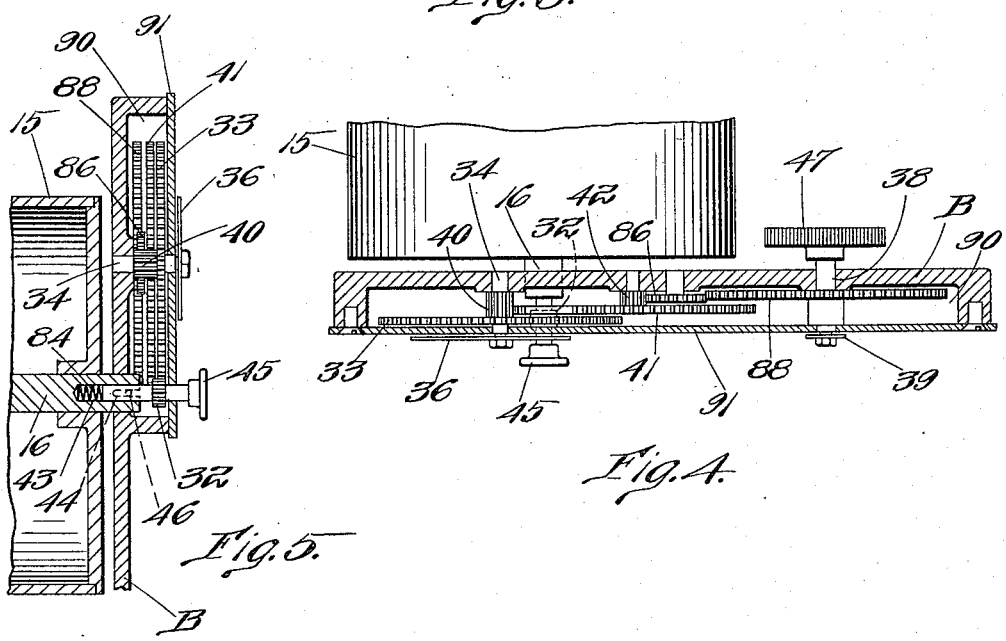

In the drawings,—Figure 1 is a front elevation of a machine embodying my invention. Fig. 2 is a plan view of the same. Fig. 3 is a front elevation in detail of the indicator mechanism. Figs. 4 and 5 are details in section on lines 4—4 and 5—5 respectively of Fig. 3.

Having reference to the drawings, and particularly to Figs. 1 and 2, there is shown at A the frame of the machine which may be of any desired form and construction. I prefer to construct the frame with two upright portions B and C in order that the rolls to be hereinafter described may be most readily and conveniently supported. The rear upright portion C is provided with two laterally extending arms D and E for the support of the unwinding shaft F and the rewinding shaft G respectively. Secured to the rear of the frame, is the motor H for driving the machine. While I prefer a motor for convenience, it is obvious that any well known means for operating the machine may be employed. The motor H is provided with a pinion 11 which engages a gear 12 secured to the end of the shaft 13 of a feed roll 14, the feed roll 14, being journaled into the frame so as to freely rotate therein, as clearly appears in Fig. 2. Intermediate between the feed roll 14 and the unwinding shaft F and parallel to each of said members, is a measuring roll 15 which is also journaled in the frame on the shaft 16 so as to be freely rotatable therein. The measuring roll is preferably larger than the feed roll and is connected with indicator mechanism, as will be hereinafter set forth.

In order that the stay strip or material to be measured shall be held firmly against the measuring roll and feed roll without danger of slippage, I provide pressure rolls 17 and 18 which bear against the measuring roll 15, and a pressure roll 19 which operates on the surface of the feed roll 14. Each of these pressure rolls is journaled by means of shafts 87 to arms 20 which are in turn secured to shafts 21, said shafts being pivoted in the frame, as shown in Fig. 1. A lever 22 is secured to each of the shafts 21, the free ends of said levers being connected with springs 23 which are in turn adjustably secured to the frame A by means of adjustment screws 24 whereby their tension may be readily varied. The tape is fed between the pressure rolls 17 and 18 and the measuring roll 15 and the pressure roll 19 and the feed roll 14, and thus any slippage of the tape on the measuring roll and feed roll is prevented.

I regard this construction as important for the reason that great difficulty has been experienced in the past in causing the tape to feed evenly through the machine. It is essential, in order that the tape may rewind in a straight and even roll, that it is fed evenly through the machine, and I have found that unless a uniform pressure be exerted transversely of the tape it will not feed evenly. Heretofore, so far as known to me, pressure rolls provided with spring mounted ends have been employed, and therefore if the tape is not threaded through the machine exactly in the center of the roll, the spring mounted end nearest to which the tape happens to be will yield more than the other end, which results in canting the roll. This places more pressure on one side of the tape than the other, and therefore results in an uneven feed. By the arrangement hereinabove described, however, the ends of the pressure roll being rigidly held in position relatively to each other, an even pressure is exerted transversely of the tape regardless of its position with the result that it rewinds in a straight and even roll. Furthermore this construction enables the pressure rolls to be moved to and from the surface upon which they operate, which is essential to readily thread the tape into the machine.

The tape passes around the measuring roll, as will hereinafter be described, and in order that the measuring roll shall at once cease rotation when the end of the tape has left it, there is provided an automatic brake roll 25 which is located intermediate the measuring roll 15 and the feed roll 14. The roll 25 is pivotally mounted on arms 26 which are secured to a shaft 27 journaled in the frame, as shown in Fig. 1. One of the arms 26 has an extension 28 which is provided on its free end with a horizontal brake member 29 so arranged as to extend below the lower surface of the measuring roll. The brake member 29 is covered with a friction material 97 of any well known form, such as leather or the like. To the extension 28, is secured a hook 30 to which a spring 31 is attached at one end, the other end of the spring being secured to a pin 32 in the frame. The tape T passes around the brake roll 25 as shown in Fig. 1. A tension on the tape lifts the brake roll 25 on the pivoted shaft 27 against the pull of the spring 31 which disengages the brake from the measuring roll and allows free rotation of the same. When the tension on the tape is relaxed the spring 31 causes the brake member to engage the measuring roll and immediately stops its rotation. A stop pin 98 is secured to the frame a short distance above one of the arms 27 to limit its movement to a point which is sufficient for the brake member 29 to be out of contact with the measuring roll. In practice, the measuring roll is twelve inches in circumference, as a convenient unit of measurement, and operates the indicator mechanism as shown in detail in Figs. 3, 4, and 5.

The indicator mechanism is supported in a pocket 90 in the upper end of the upright portion B of the frame A. This pocket 90 has a removable front face 91 which is provided with two dials 92 and 93. Connected with the shaft 16 of the measuring roll 15 as will hereinafter be described is a small pinion 32 which normally engages a gear 33 secured to a shaft 34 which is journaled in the upright portion B and the front face 91 forming the rear and front sides respectively of the pocket 90. The shaft 34 extends through the face 91 centrally of the dial 92 and is provided on its free end with a hand 36. The ratio of the small pinion 32 to the gear 33 being, for instance 1 to 10 and the measuring roll 15 being twelve inches in circumference, the dial 92 is capable of registering ten feet of tape. The dial 93 coöperates with a hand 39 secured to the free end of a shaft 38 which is in turn connected with the pinion 33 by means of the gears 40, 41, 42, 86 and 88. The dial 93 is so arranged as to measure 1000 feet. While I have described these somewhat in detail, of course any scale of measurement may be adopted and additional dials may be added if required. In order that the hands may be turned back to zero when desired, I have provided the shaft 16 with a hole 43 and a slot 44. A thumb bolt 45 to which the small pinion 32 is secured extends through the face 91 and fits loosely the hole in the shaft 16. The thumb bolt 45 and pinion 32 are caused to rotate with the shaft 16 by means of a transverse pin 46 which is slidable longitudinally of the slot 44, to disengage the pinion 32 from the pinion 33. A spiral push spring 84 normally holds the pinion 32 in engagement with the pinion 33. When it is desired to move the indicator independently of the measuring wheel, it is only necessary to press upon the thumb bolt 45 which compresses the spring 38 and disengages the pinions 32 and 33. In order that the indicators may be turned back to zero I provide a knob 47 on the rear end of the indicator shaft 38.

The unwinding shaft F is secured to the arm D to hold the roll of tape to be measured. The rewinding shaft G rests in a journal 49 in the arm E and in a cup bearing 94 in the arm 50. The last mentioned member is pivoted at 51 so that it may be swung away from the shaft to permit the removal of the tape roll and is normally retained in supporting position by means of a spring latch which consists of a latch member 52 pivoted at 60 and actuated by a spiral pull spring 61 secured to the frame by means of a pin 62. The rewinding shaft is driven by a belt 53 placed over the pulley wheels 54 and 55 which are secured to the rewinding shaft G and the feed roll shaft 13 respectively as shown in Fig. 2. The proportions of these pulleys are such as to cause the rewinding shaft to turn a wood core of the smallest diameter on which tape is to be wound and which has been nonrotatably secured to the rewinding shaft G at a speed that will make the surface of the wood core travel at a slightly faster speed than the surface of the feed roll. Inasmuch as the tape is driven through the machine by means of the feed roll 14 this results in the tape holding back the rewinding shaft and causes the belt to slip which gives the necessary tension to the tape to produce a firm and evenly wound roll. As the diameter of the roll increases on the rewinding shaft I have found that it requires gradually more and more tension in order that a uniformly solid roll may be produced, but as the diameter of the roll increases, the slip of the belt increases correspondingly and therefore the tension on the tape is proportionally increased. The rewinding shaft is provided with a single small flange 56 to aid in the proper starting of the tape on the core.

The unwinding shaft is provided with deep flanges 57 and 58 which are slidable thereon to inclose rolls of various widths and which are provided with collars 95 and thumb screws 96 by which they may be non-rotatably secured to the shaft in the position desired. In the collar 95 of the flange 58 is a spring adjustment 59 which holds the flange against the side of the roll of tape with a yielding pressure. The unwinding shaft F does not rotate and therefore a friction contact is produced on the sides of the roll of tape, which gives the necessary tension, and inasmuch as the roll of tape requires less tension as it decreases in size this method of tension produces the proper tension on account of the lesser surface contact and therefore lesser tension as the roll decreases in diameter.

In operating the machine the tape roll is placed on the unwinding shaft F between the flanges 57 and 58 and the flanges are secured to the shaft. The tape T is then passed under the pressure roll 17, over the measuring roll 15, under the pressure roll 18, under the brake roll 25, over the feed roll 14, around the pressure roll 19, and thence to the rewinding shaft G.

When the machine is started the tension on the tape caused by the feed roll will raise the brake roll 25 and disengage the brake 29 from the surface of the measuring roll 15 which will allow the measuring roll to rotate freely. When the end of the tape passes the pressure roll 18 the tension on the brake roll 25 is at once relaxed and the spring 31 causes the brake to engage the measuring roll and arrest its rotation. I regard this as an important feature of my invention for the reason that it is essential for accurate measurement by the machine.

What I claim is:

1. In a tape measuring machine, the combination of an unwinding shaft, a measuring roll, a pressure roll yieldingly operating against said measuring roll to hold the tape in contact with its surface, an automatic brake mechanism acting on the measuring roll, a feed roll, a pressure roll yieldingly operating on said feed roll, a rewinding shaft, means for operating said feed roll and said rewinding shaft to cause said tape to rotate the measuring roll, and means for registering the rotation of said measuring roll.

2. In a tape measuring machine, the combination of a measuring roll, winding mechanism, and brake mechanism, said brake mechanism comprising a brake roll and a shoe, rigidly connected pivotal supports in which said brake roll is mounted, a supporting member secured to said supports on which said shoe is mounted, means for yieldingly holding the shoe in contact with the measuring roll, said brake roll being mounted between the measuring roll and the winding mechanism so that a tension on the tape passing from said measuring roll around the brake roll to the winding mechanism causes said roll to hold said shoe away from the measuring roll.

3. In a tape measuring machine, the improved measuring mechanism comprising a measuring roll in combination with a pressure roll and an automatic brake roll, said pressure roll being yieldingly mounted to operate against said measuring roll and said automatic brake roll having a brake member and a spring attachment, said spring attachment normally holding said brake member in frictional contact with the measuring roll, a feed roll, means for operating said feed roll to draw tape around the measuring roll and the automatic brake roll, the tension of said tape acting against said spring to disengage said brake member from the measuring roll.

4. In a tape measuring machine, an unwinding tension device comprising a non-rotatable shaft for a tape roll, flanges secured to said shaft, and yielding means for causing said flanges to frictionally bear against the sides of the tape roll in combination with a rewinding tension device comprising a feed roll and rewinding shaft, a belt and pulley connection between said roll and shaft, and means for rotating the feed roll, the belt and pulley connection being proportioned to give a greater surface speed to the rewinding shaft than to that of the feed roll so that the belt slips on the pulleys.

In testimony whereof I affix my signature, in presence of two witnesses.

CHARLES H. CROWELL.

Witnesses:
 WALTER N. MACADAM,
 JANET M. TURNAN.

Copies of this patent may be obtained for five cents each, by addressing the "Commissioner of Patents, Washington, D. C."